(12) United States Patent
Leblon et al.

(10) Patent No.: US 11,951,694 B2
(45) Date of Patent: Apr. 9, 2024

(54) FIBROUS TEXTURE FOR A CASING MADE OF COMPOSITE MATERIAL WITH HYBRID WARP STRANDS

(71) Applicant: SAFRAN AIRCRAFT ENGINES, Paris (FR)

(72) Inventors: Baptiste Leblon, Moissy-Cramayel (FR); Clémentine Arnold, Moissy-Cramayel (FR); Clément Bourolleau, Moissy-Cramayel (FR); Thomas Dupays, Moissy-Cramayel (FR); Serge Domingues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/012,837

(22) PCT Filed: Jun. 15, 2021

(86) PCT No.: PCT/FR2021/051065
§ 371 (c)(1),
(2) Date: Dec. 23, 2022

(87) PCT Pub. No.: WO2021/260291
PCT Pub. Date: Dec. 30, 2021

(65) Prior Publication Data
US 2023/0191721 A1    Jun. 22, 2023

(30) Foreign Application Priority Data
Jun. 26, 2020    (FR) ...................................... 2006718

(51) Int. Cl.
*B29C 70/24*    (2006.01)
*D03D 1/00*    (2006.01)
(Continued)

(52) U.S. Cl.
CPC ............... *B29C 70/24* (2013.01); *D03D 1/00* (2013.01); *D03D 15/267* (2021.01);
(Continued)

(58) Field of Classification Search
CPC ........ B29C 70/24; D03D 1/00; D03D 15/267; D03D 15/275; D03D 25/005; D10B 2505/02
See application file for complete search history.

(56) References Cited

U.S. PATENT DOCUMENTS

| | | | | |
|---|---|---|---|---|
| 4,770,926 A | * | 9/1988 | Yamamura | C08K 7/02 442/205 |
| 2013/0082417 A1 | | 4/2013 | Gummel et al. | |

FOREIGN PATENT DOCUMENTS

| | | |
|---|---|---|
| FR | 3 070 402 A1 | 3/2019 |
| FR | 3 084 088 A1 | 1/2020 |

(Continued)

OTHER PUBLICATIONS

[NPL-1] Coupe et al. (WO 2019/043333 A1); Mar. 2019 (EPO—machine translation to English). (Year: 2019).*

(Continued)

*Primary Examiner* — David Sample
*Assistant Examiner* — Donald M Flores, Jr.
(74) *Attorney, Agent, or Firm* — Pillsbury Winthrop Shaw Pittman LLP

(57) ABSTRACT

A fibrous texture has the shape of a strip extending in a longitudinal direction over a determined length between a proximal portion and a distal portion and in a lateral direction over a determined width between a first lateral edge and a second lateral edge. The fibrous texture has a three-dimensional or multi-layer weaving between a plurality of layers of warp strands extending in the longitudinal direction and a plurality of layers of weft strands extending in the (Continued)

lateral direction, the fibrous texture including first and second longitudinal sections extending over a width from the first or second lateral edge smaller than the determined width of the fibrous texture along the lateral direction. The first and second longitudinal sections each include warp strands and weft strands constituted by carbon fibers. The fibrous texture further includes a third section present between the first and second sections.

10 Claims, 7 Drawing Sheets

(51) Int. Cl.
     *D03D 15/267*    (2021.01)
     *D03D 15/275*    (2021.01)
     *D03D 25/00*     (2006.01)
     *B29L 31/00*     (2006.01)
(52) U.S. Cl.
     CPC ......... *D03D 15/275* (2021.01); *D03D 25/005* (2013.01); *B29L 2031/7504* (2013.01); *D10B 2505/02* (2013.01)

(56) References Cited

FOREIGN PATENT DOCUMENTS

| FR | 3 084 089 A1 | 1/2020 | |
|---|---|---|---|
| JP | 2005-179829 A | 7/2005 | |
| JP | 2005179829 A * | 7/2005 | |
| WO | WO 2006/136755 A2 | 12/2006 | |
| WO | WO-2019043333 A1 * | 3/2019 | ........... D03D 1/0052 |

OTHER PUBLICATIONS

[NPL-2] Kawabe (JP 2005-179829 A); Jul. 2005 (EPO—machine translation to English). (Year: 2005).*
International Preliminary Report on Patentability and the Written Opinion of the International Searching Authority as issued in International Patent Application No. PCT/FR2021/051065, dated Dec. 13, 2022.
International Search Report as issued in International Patent Application No. PCT/FR2021/051065, dated Sep. 23, 2021.

* cited by examiner

[Fig. 1]
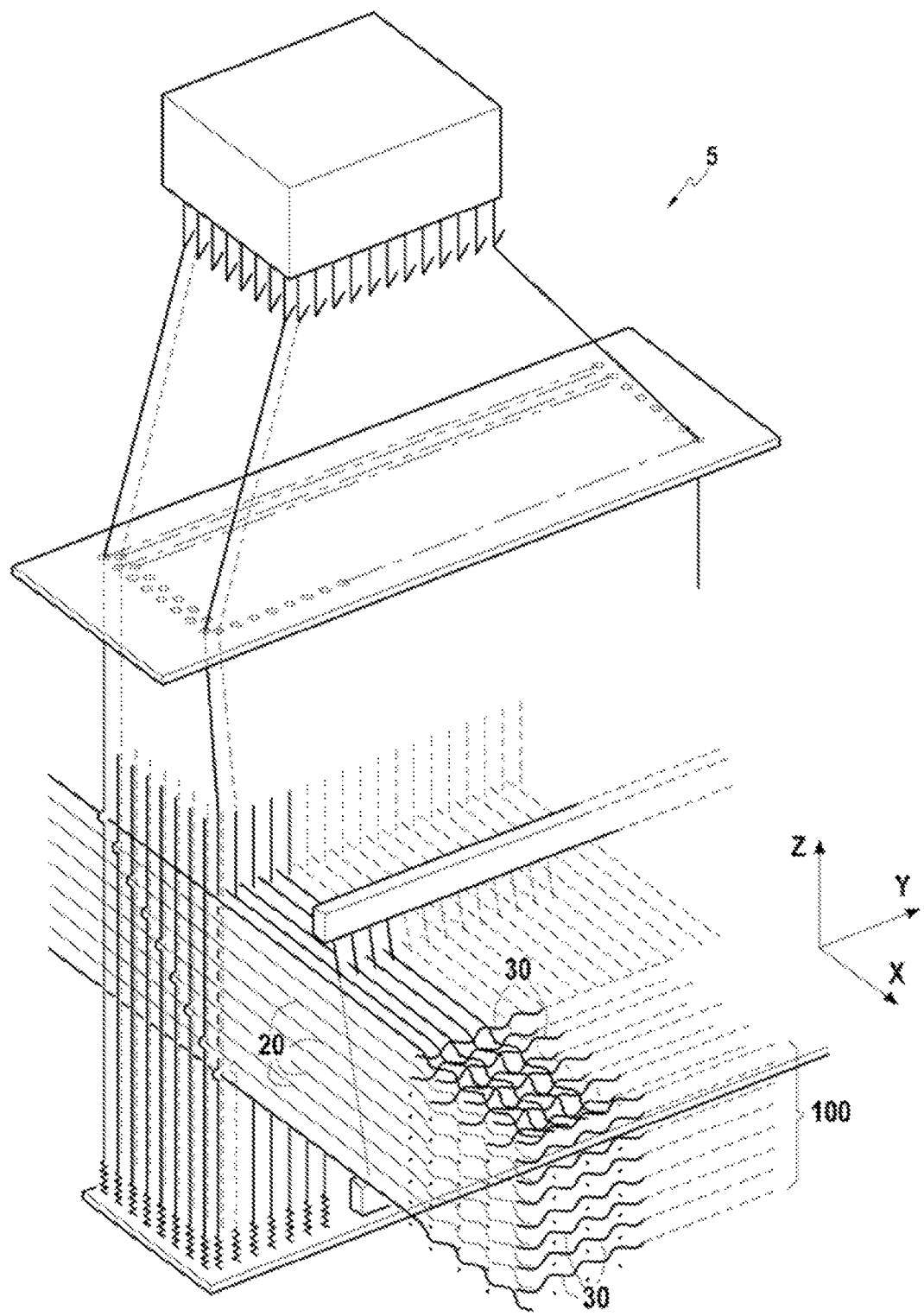

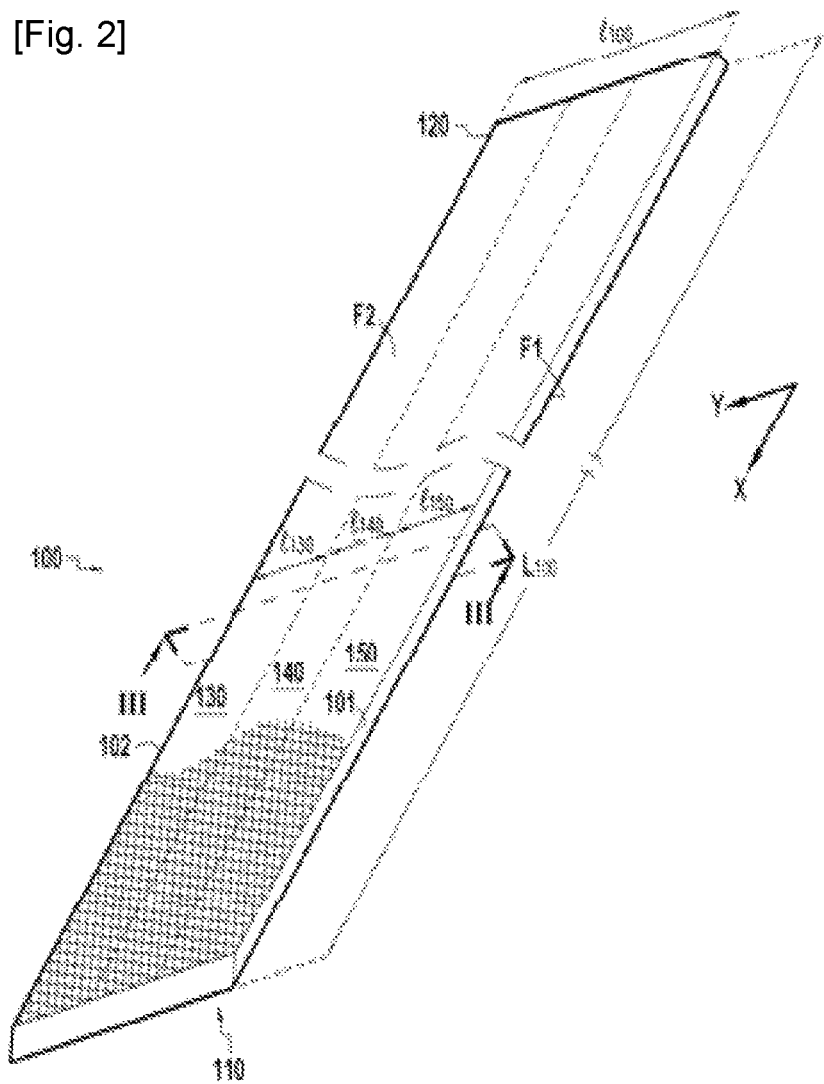
[Fig. 2]

[Fig. 3]
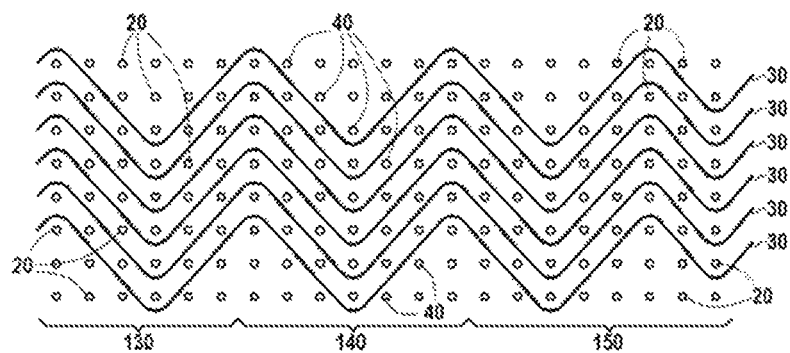
[Fig. 4]
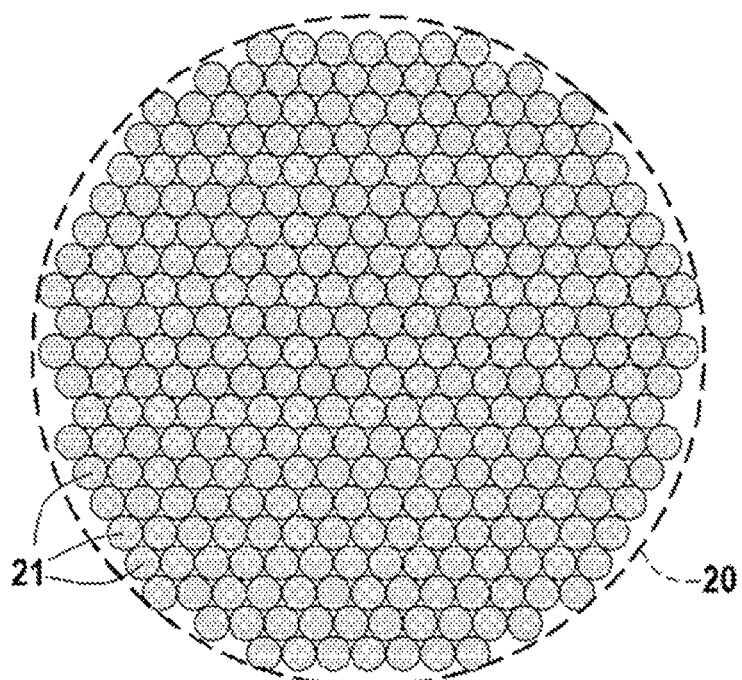

[Fig. 5]
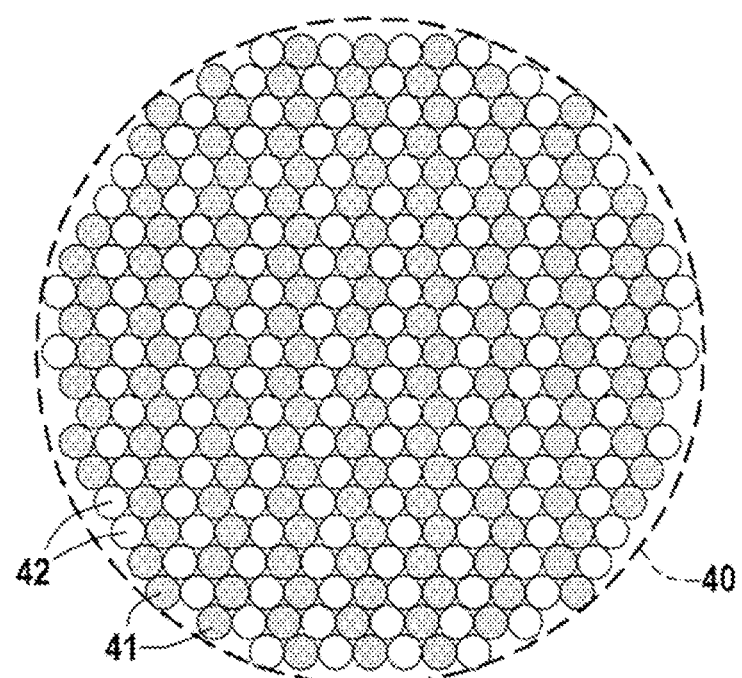

[Fig. 6]
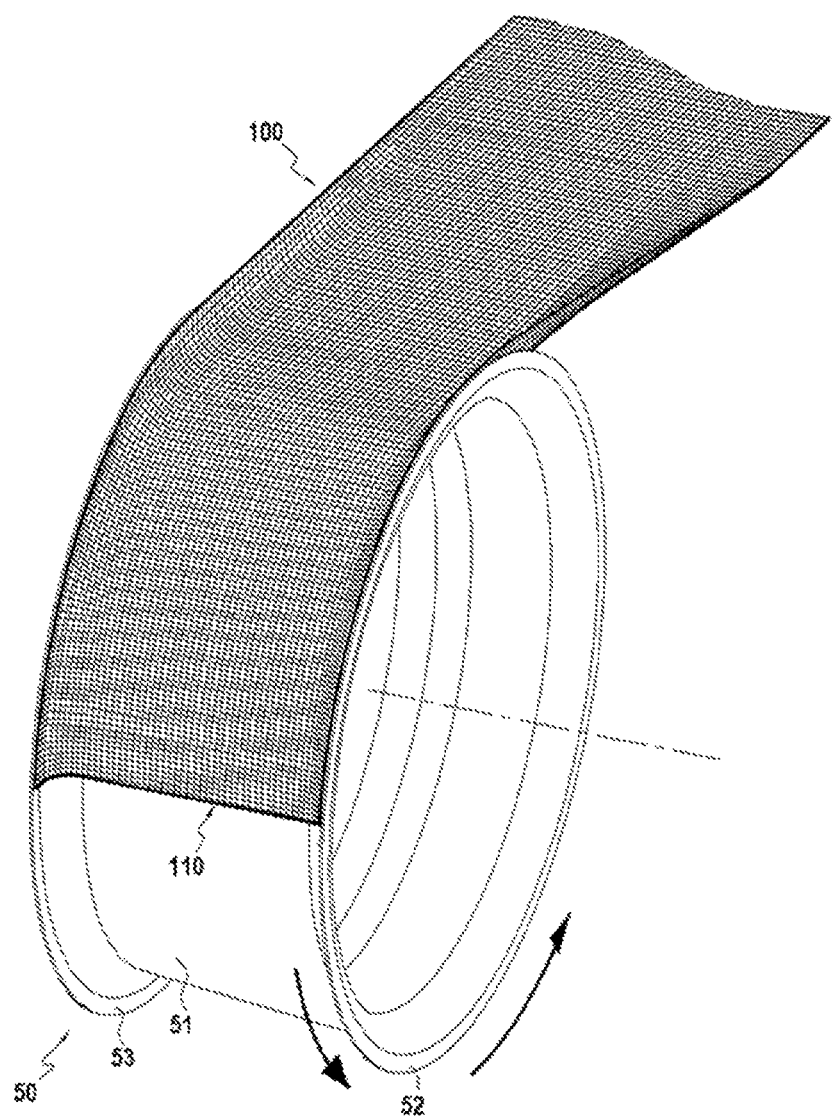

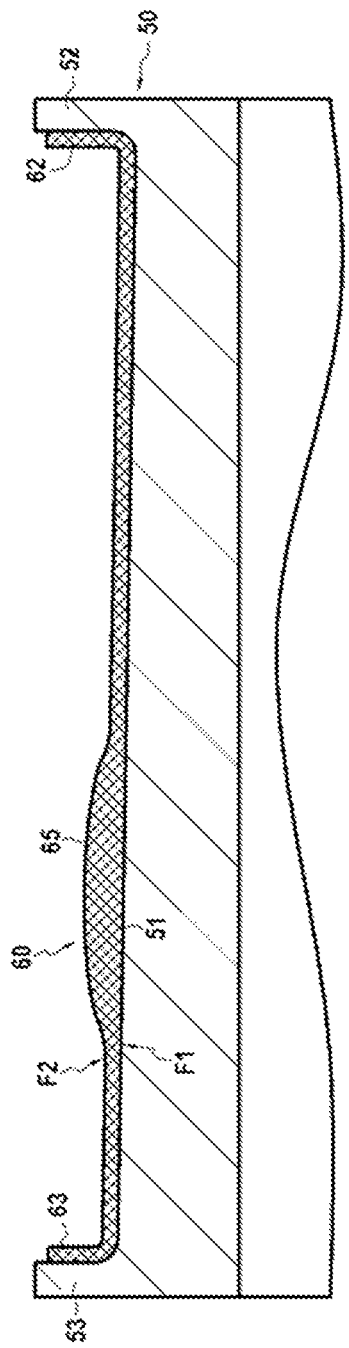
[Fig. 7]

[Fig. 8]
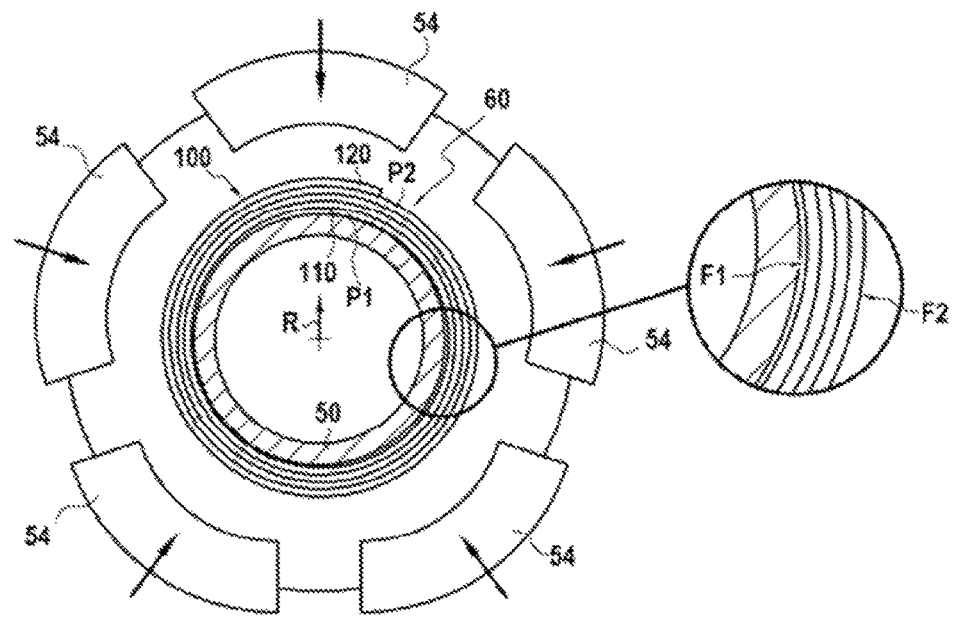
[Fig. 9]
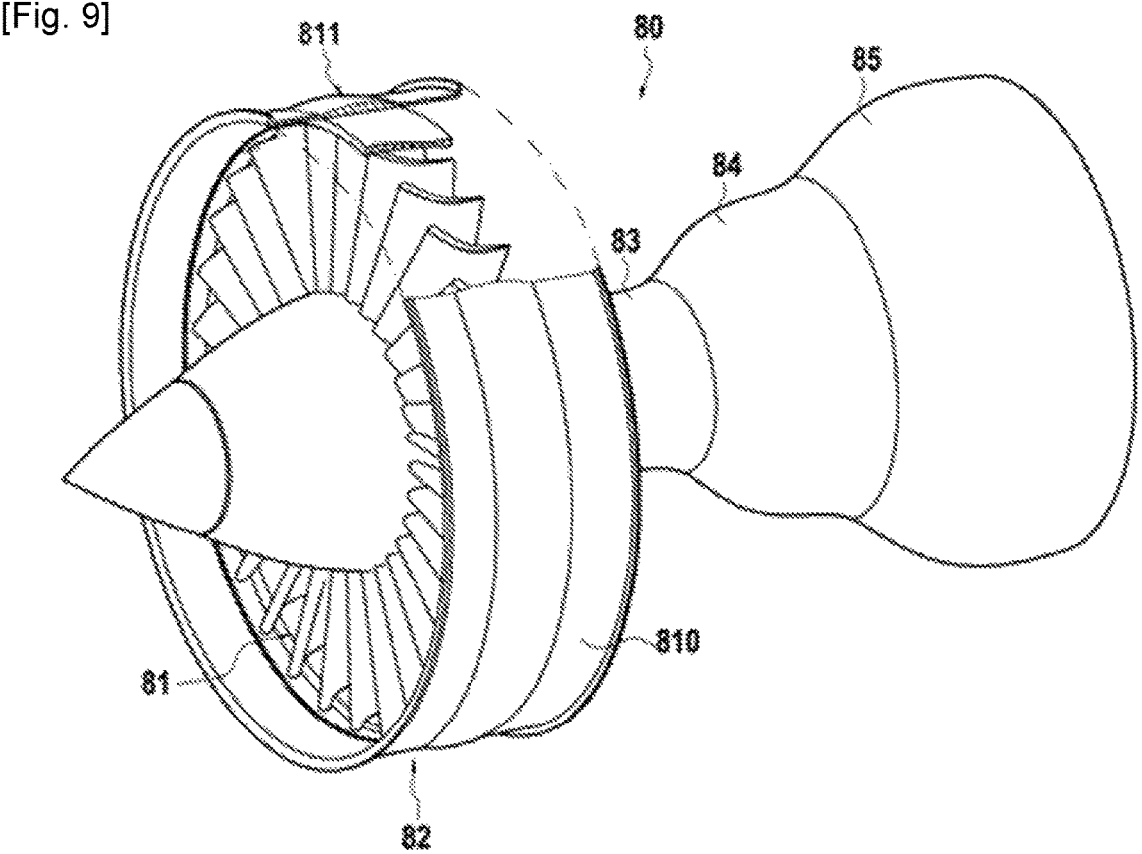

FIBROUS TEXTURE FOR A CASING MADE OF COMPOSITE MATERIAL WITH HYBRID WARP STRANDS

CROSS-REFERENCE TO RELATED APPLICATIONS

This application is the U.S. National Stage of PCT/FR2021/051065, filed Jun. 15, 2021, which in turn claims priority to French patent application number 20 06718 filed Jun. 26, 2020. The content of these applications are incorporated herein by reference in their entireties.

TECHNICAL FIELD

The invention relates to the gas turbine casings, and more particularly, but not exclusively, to the gas turbine fan casings for aeronautical engines.

PRIOR ART

In an aeronautical gas turbine engine, the fan casing performs several functions. It defines the air inlet flowpath in the engine, supports an abradable material facing the blade tips of the fan, supports a possible sound wave absorption structure for the acoustic treatment at the inlet of the engine and incorporates a retention shield. The retention shield constitutes as a debris trap retaining the debris, such as ingested objects or damaged blade fragments, projected by centrifugation, in order to prevent them from passing through the casing and reaching other portions of the aircraft.

Previously made of metal material, the casings, such as the fan casing, are now made of composite material, that is to say from a fibrous preform densified by an organic matrix, which allows making parts having a lower overall mass than these same parts when they are made of metal material while having an at least equivalent if not greater mechanical resistance.

The manufacture of a fan casing made of organic-matrix composite material is described in particular in document US 2013/082417. In the casing disclosed in document US 2013/082417, the retention shield is constituted by an extra thickness section obtained at the level of the fibrous reinforcement of the casing which has a variable thickness. The fibrous reinforcement is obtained by winding of a 3D woven fibrous texture in which a gradual increase in thickness is obtained by changing the size of the warp strands or yarns.

With this manufacturing technique, once the arrangement and nature of the strands have been defined, it is the amount of fibers that determines the retention capacity of the casing. However, this third factor has a direct impact on the mass and cost of the casing.

However, there is a need for a casing made of composite material with a good retention capacity while having an overall mass and a controlled manufacturing cost.

DISCLOSURE OF THE INVENTION

To this end, the invention proposes a fibrous texture having the shape of a strip extending in a longitudinal direction over a determined length between a proximal portion and a distal portion and in a lateral direction over a determined width between a first lateral edge and a second lateral edge, the fibrous texture having a three-dimensional or multi-layer weaving between a plurality of layers of warp strands extending in the longitudinal direction and a plurality of layers of weft strands extending in the lateral direction, the fibrous texture comprising first and second longitudinal sections each extending over the determined length of the fibrous texture along the longitudinal direction and over a width from the first or second lateral edge smaller than the determined width of the fibrous texture along the lateral direction, the first and second longitudinal sections each comprising warp strands and weft strands constituted by carbon fibers, the fibrous texture further comprising an intermediate section present between the first and second sections, characterized in that at least a portion of the warp strands present in the intermediate section are hybrid warp strands constituted by both carbon fiber filaments and glass fiber filaments.

The hybridization of some warp strands with glass fiber filaments allows improving the resistance of the casing to impact, for example with a detached blade. Indeed, the glass fiber filaments have a shear and tensile elongation resistance much higher than the one presented by the carbon fiber filaments. Thus, the fibrous texture according to the invention comprises hybrid warp strands in the section intended to form the retention area or shield of the casing in order to impart greater shear resistance to this section.

Furthermore, the supply cost of the glass fibers being much lower than the supply cost for the carbon fibers, the insertion of glass fiber filaments in warp strands allows reducing the manufacturing cost of the fibrous texture and consequently of the final casing, without impact on an important function of the casing, namely the retention.

According to one particular characteristic of the fibrous texture of the invention, the intermediate section comprises hybrid warp strands with a size greater than the size of the warp strands present in the first and second longitudinal sections.

According to another particular characteristic of the fibrous texture of the invention, the hybrid warp strands comprise between 10% and 90% of glass fiber filaments.

The invention also relates to a fibrous preform for an aeronautical casing comprising a winding over several turns of a fibrous texture according to the invention, the intermediate section of the fibrous texture forming a retention area preform.

The invention also relates to a gas turbine casing made of composite material, comprising a fibrous reinforcement constituted by a fibrous preform according to the invention, and a matrix densifying the fibrous reinforcement. The casing can in particular be a gas turbine fan casing.

The invention also relates to an aeronautical gas turbine engine having a casing according to the invention.

The invention also relates to a method for manufacturing a fibrous texture by three-dimensional or multi-layer weaving between a plurality of layers of warp strands extending in a longitudinal direction and a plurality of layers of weft strands extending in the lateral direction, the fibrous structure having the shape of a strip extending in the longitudinal direction over a determined length between a proximal portion and a distal portion and in the lateral direction over a determined width between a first lateral edge and a second lateral edge, the method comprising the weaving of first and second longitudinal sections each extending over the determined length of the fibrous texture along the longitudinal direction and over a width from the first or second lateral edge smaller than the determined width of the fibrous texture along the lateral direction, the first and second longitudinal sections each comprising warp strands and weft strands constituted by carbon fibers, the method further comprising the weaving of an intermediate section present between the first and second longitudinal sections, characterized in that at least a portion of the warp strands present in the intermediate section are hybrid warp strands constituted by both carbon fiber filaments and glass fiber filaments.

According to one particular characteristic of the method of the invention, the intermediate section comprises hybrid warp strands having a size greater than the size of the warp strands present in the first and second longitudinal sections.

According to another particular characteristic of the method of the invention, the hybrid warp strands comprise between 10% and 90% of glass fiber filaments.

BRIEF DESCRIPTION OF THE DRAWINGS

FIG. 1 is a schematic perspective view of a loom showing the three-dimensional weaving of a fibrous texture, FIG. 2 is a schematic perspective view of a fibrous texture in accordance with one embodiment of the invention, FIG. 3 is a lateral section of the fibrous texture of FIG. 2 and showing a weave plane, FIG. 4 is a cross-section showing the section of a 100% carbon warp strand, FIG. 5 is a sectional view showing the section of a hybrid warp strand, FIG. 6 is a schematic perspective view showing the winding of a fibrous texture on a shaping tool, FIG. 7 is an axial sectional half-view of a casing preform obtained by winding of a fibrous texture as shown in FIG. 6, FIG. 8 is a sectional view showing the positioning of injection sectors on the preform of the casing of FIG. 5, FIG. 9 is a perspective view of an aeronautical engine in accordance with one embodiment of the invention.

DESCRIPTION OF THE EMBODIMENTS

The invention generally applies to any casing made of organic-matrix composite material for a gas turbine.

The invention will be described below in the context of its application to a fan casing of an aeronautical gas turbine engine.

The method for manufacturing a casing made of composite material according to the invention begins, as represented in FIG. 1, with the production of a fibrous texture 100 by weaving using a jacquard-type loom 5 on which a bundle of warp strands or yarns 20 and 40 has been disposed into a plurality of layers, the warp yarns being linked by weft strands or yarns 30.

The fibrous texture is made by three-dimensional weaving. By "three-dimensional weaving" or "3D weaving" it is meant here a weaving mode by which at least some of the weft yarns bind warp yarns over several layers of warp yarns or vice versa. The fibrous texture may have an interlock weave. By "interlock" weaving, it is meant here a weave in which each layer of weft yarns binds several layers of warp yarns, with all the yarns of the same weft column having the same movement in the weave plane. Other weaves are envisageable. The yarns used can be in particular yarns made of carbon, glass or silicon carbide fibers.

As illustrated in FIG. 2, the fibrous texture 100 has the shape of a strip which extends lengthwise in a longitudinal direction X corresponding to the travel direction of the warp strands 20 and 40 and widthwise or transversely in a lateral direction Y between first and second lateral edges 101 and 102, the lateral direction Y corresponding to the direction of the weft strands 30. The fibrous texture extends longitudinally over a determined length $L_{100}$ in the direction X between a proximal portion 110 intended to form the beginning of the winding of a fibrous preform on a shaping tool and a distal portion 120 intended to form the end of the winding of the fibrous preform.

The fibrous texture further has an intermediate section 140 extending over a determined width $I_{140}$ in the direction Y, the intermediate section 140 being intended to form the shank or the shroud of the casing. The intermediate section 140 is intended to be present facing the blades and defines the retention area or shield of the casing to be obtained. The intermediate section 140 is set back from the first 101 and second 102 lateral edges and extends over a determined width $I_{140}$ smaller than the width Iwo of the texture 100. The intermediate section 140 is delimited between two longitudinal sections 130 and 150 each extending over a determined width, respectively 1130 and 1150, in the direction Y and over the length $L_{100}$ of the texture 100. The first longitudinal section 130 extends between the first lateral edge 101 and the intermediate section 140. The second longitudinal section 150 extends between the second lateral edge 102 and the intermediate section 140. Each of the longitudinal sections 130 and 150 is intended at least partly to form an annular clamp of the casing.

The length $L_{100}$ of the fibrous texture 100 is determined as a function of the circumference of the tool or of the shaping mold so as to allow making a determined number of turns of the fibrous texture, for example four turns.

In accordance with the invention, the intermediate section 140 of the fibrous texture includes hybrid warp strands 40 constituted by both carbon fiber filaments and glass fiber filaments, while the warp strands 20 present in longitudinal sections 130 and 150 and the weft strands 30 are constituted only with carbon fiber filaments. More specifically, as illustrated in FIG. 4, the warp strands or yarns 20 are constituted by a plurality of filaments 21 made of carbon fibers. As illustrated in FIG. 5, the hybrid warp yarns or strands 40 are constituted by both carbon fiber filaments 41 and glass fiber filaments 42.

The warp strands or warp yarns are each constituted by several hundreds or thousands of filaments, in turn each constituted by carbon or glass fibers.

The hybrid warp strands 40 comprise between 10% and 90% glass fiber filament 41. For example, a hybrid warp strand having a count of 24 k (24,000 filaments) comprising 50% of glass fiber filaments glass will contain 12,000 carbon fiber filaments and 12,000 carbon fiber filaments. The count or numbering of a yarn corresponds to its slub (depending on the type of material of the yarn, the density varies, therefore the volume occupied for the same mass will be different) and can be defined in several ways. It can be defined in particular by the linear mass of the yarn (mass per unit length) which is generally expressed in tex corresponding to the mass in grams of 1,000 meters of yarn or in decitex (dtx) corresponding to the mass (in grams) of 10,000 meters of yarn. The count of a yarn can also be defined by the number of filaments that compose it. In this case, the count of the yarn is expressed in "K" which corresponds to the number in thousands of filaments per yarn. For example, a 1K yarn comprises 1,000 filaments.

In a known manner, a strand can be made by spinning a plurality of filaments of a liquid precursor and by grouping together the filaments into a strand. Before the grouping of the filaments, a sizing is generally carried out which consists in depositing on the filaments a bonding agent ensuring the cohesion of the filaments together and facilitating the subsequent manipulations of the strand. The hybrid warp strands can be formed by grouping together a determined amount of carbon fiber filaments and a determined amount of glass fiber filaments, the filaments being randomly distributed in the strand. According to one variant, the hybrid warp strands can be formed by grouping together several sets of filaments already formed into "sub-strands", that is to say strands with a lower count multiple of the count of the hybrid strand to achieve. By way of non-limiting example, a hybrid strand having a count of 48 k (48,000 filaments) can be obtained by grouping together two carbon strands having a count of 12 k (i.e. twice 12,000 carbon fiber filaments) with two glass strands with a count of 12 k (i.e. 12,000 glass fiber filaments). The filaments as a whole or already grouped together into sub-strands can be twisted during the formation of the hybrid strand.

FIG. 3 illustrates an example of weave plane of the fibrous texture of FIG. 2 which comprises 8 layers of warp strands 20 or 40 and 6 layers of weft strands 30. Each layer of weft strands binds three layers of warp strands. In the example described here, the warp strands of two neighboring warp layers are aligned on the same columns. A staggered disposition could also be adopted, the layers of warp strands being distributed in half-columns disposed in a staggered manner. Weaves of the interlock type that can be used are described in document WO 2006/136755.

The longitudinal sections 130 and 150 are woven with warp strands 20 and weft strands 30 made of carbon fiber filaments, while the intermediate section is woven with hybrid warp strands 40, namely grouping together each of the filaments made of both carbon and glass fibers, and the weft strands 30 made of carbon fiber filaments.

In the example described here, the hybrid warp strands 40 present in the intermediate section 140 have a higher count than the count of the warp strands 20 present in the first and second longitudinal sections 130, 150. This allows creating an extra thickness in the fibrous texture 100 and in the final casing at the level of the retention area. However, according to one variant, the hybrid warp strands can have the same count as the warp strands present in the longitudinal sections. According to yet another variant, a portion of the hybrid warp strands can have the same count as the warp strands present in the longitudinal sections while another portion of the hybrid warp strands have a higher count than that of the warp strands present in the longitudinal sections.

Still in the example described here, the intermediate section 140 comprises only hybrid warp strands. According to one variant, the intermediate section can comprise both hybrid warp strands and warp strands entirely constituted by carbon fiber filaments. By way of non-limiting example, only some layers of the plurality of warp layers present on the side of an inner face of the fibrous texture are constituted by hybrid strands, the other layers of the plurality of layers of warp strands being constituted by strands of carbon fiber filaments. These may be for example the first four layers starting from the inner face F1 of the fibrous texture 100, while the other layers of weft yarns or strands located on the side of the outer face F2 of the fibrous texture are only constituted by strands of carbon fiber filaments.

An example has just been described in which the fibrous texture has an interlock weave with 8 warp layers and 6 weft layers. However, there is no departure from the scope of the invention when the number of weft and warp layers is different, or when the fibrous texture has a different weave from an interlock weave.

As illustrated in FIG. 6, a fibrous reinforcement of the casing is formed by winding on a mandrel 50 of the fibrous texture 100 described previously, the fibrous reinforcement constituting a complete tubular fibrous preform of a casing forming a single piece. For this purpose, the mandrel 50 has an outer surface 51 whose profile corresponds to the inner surface of the casing to be made. The mandrel 50 also includes two flanges 52 and 53 to form fibrous preform 62 and 63 portions corresponding to the clamps of the casing (the clamps 62 and 63 are visible in FIG. 7).

FIG. 7 shows a sectional view of the fibrous preform 60 obtained after winding of the fibrous texture 100 into several layers on the mandrel 50. The number of layers or coils is a function of the desired thickness and the thickness of the fibrous texture. It is preferably at least equal to 2. In the example described here, the preform 60 comprises 4 layers of fibrous texture 100. The fibrous preform here includes an extra thickness 65 corresponding to the intermediate section 140 wound over several turns and intended to form the retention area or shield of the casing.

The fibrous preform 60 is then densified by a matrix.

The densification of the fibrous preform consists in filling the porosity of the preform, in all or part of the volume thereof, with the material constituting the matrix.

The matrix can be obtained in a manner known per se using the liquid process. The liquid process consists in impregnating the preform with a liquid composition containing an organic precursor of the material of the matrix. The organic precursor is usually in the form of a polymer, such as a resin, optionally diluted in a solvent. The fibrous preform is placed in a mold that can be closed in a sealed manner with a housing having the shape of the final molded part. As illustrated in FIG. 8, the fibrous preform 60 is here placed between a plurality of sectors 54 forming the counter-mold and the mandrel 50 forming the support, these elements having respectively the external shape and the internal shape of the casing to be made. Then, the liquid matrix precursor, for example a resin, is injected into the entire housing to impregnate the preform.

The transformation of the precursor into an organic matrix, namely its polymerization, is carried out by heat treatment, generally by heating of the mold, after removal of any solvent and crosslinking of the polymer, the preform still being held in the mold with a shape corresponding to that of the part to be made. The organic matrix can be in particular obtained from epoxy resins, such as, for example, the high-performance epoxy resin sold, or from liquid precursors of carbon or ceramic matrices.

In the case of the formation of a carbon or ceramic matrix, the heat treatment consists in pyrolyzing the organic precursor to transform the organic matrix into a carbon or ceramic matrix depending on the precursor used and the pyrolysis conditions. By way of example, liquid carbon precursors can be resins with a relatively high coke content, such as phenolic resins, while liquid ceramic precursors, in particular SiC, can be resins of the polycarbosilane (PCS) or polytitanocarbosilane (PTCS) or polysilazane (PSZ) type. Several consecutive cycles, from impregnation to heat treatment, can be carried out to reach the desired degree of densification.

The densification of the fibrous preform can be carried out by the well-known transfer molding called RTM (Resin Transfer Molding). In accordance with the RTM process, the fibrous preform is placed in a mold having the shape of the casing to be made. A thermosetting resin is injected into the inner space delimited between the part made of rigid material and the mold and which comprises the fibrous preform. A pressure gradient is generally established in this inner space between the place where the resin is injected and the orifices for discharging it in order to monitor and optimize the impregnation of the preform by the resin.

The resin used can be for example an epoxy resin. The resins suitable for the RTM processes are well known. They preferably have a low viscosity to facilitate their injection into the fibers. The choice of the temperature class and/or the chemical nature of the resin is determined according to the thermomechanical stresses to which the part must be subjected. Once the resin has been injected into the entire reinforcement, it is polymerized by heat treatment in accordance with the RTM process.

After injection and polymerization, the part is demolded. The part is finally trimmed to remove the excess resin and the chamfers are machined to obtain a casing 810 having a shape of revolution as illustrated in FIG. 9.

The casing 810 represented in FIG. 9 is a fan casing of an aeronautical gas turbine engine 80. Such an engine, as shown very schematically in FIG. 9 comprises, from upstream to downstream in the flow direction of the gas stream, a fan 81 disposed at the inlet of the engine, a compressor 82, a combustion chamber 83, a high-pressure turbine 84 and a low-pressure turbine 85. The engine is housed inside a casing comprising several portions corresponding to different elements of the engine. Thus, the fan 81 is surrounded by the casing 810. The casing 810 comprises a retention area or shield 811 corresponding to the extra thickness of the fibrous preform 60 and comprising the hybrid warp strands described above.

Thanks to the presence of hybrid warp strands incorporating glass fiber filaments in the retention area of the casing, the depth of penetration of a projectile, for example a blade or a blade portion, impacting the inner surface of the casing, is limited. A larger portion of the casing material is thus preserved, which allows effectively ensuring the management of the deformation of the casing and the restitution of the energy stored in the casing linked to the fragment of the blade lost during a blade or blade fraction loss event.

By using hybrid strands, it is possible to perform two different functions. Indeed, the carbon fiber filaments impart a stiffness necessary for the mechanical function required of the casing, while the glass fiber filaments impart high shear resistance for the shear absorption function required of the casing during the impact with a blade or a blade fragment.

The invention claimed is:

1. A fibrous texture having the shape of a strip extending in a longitudinal direction over a determined length between a proximal portion and a distal portion and in a lateral direction over a determined width between a first lateral edge and a second lateral edge, the fibrous texture having a three-dimensional or multi-layer weaving between a plurality of layers of warp strands extending in the longitudinal direction and a plurality of layers of weft strands extending in the lateral direction, the fibrous texture comprising first and second longitudinal sections each extending over the determined length of the fibrous texture along the longitudinal direction and over a width from the first or second lateral edge smaller than the determined width of the fibrous texture along the lateral direction, the first and second longitudinal sections each comprising warp strands and weft strands constituted by carbon fibers, the fibrous texture further comprising an intermediate section present between the first and second sections, wherein at least a portion of the warp strands present in the intermediate section are hybrid warp strands constituted only by both carbon fiber filaments and glass fibers filaments.

2. The fibrous texture according to claim 1, wherein the intermediate section comprises hybrid warp strands having a size greater than the size of the warp strands present in the first and second longitudinal sections.

3. The fibrous texture according to claim 1, wherein the hybrid warp strands comprise between 10% and 90% of glass fiber filaments based upon the total number of filaments comprising the hybrid warp strand.

4. A fibrous preform for an aeronautical casing comprising a winding over several turns of the fibrous texture according to claim 1, the intermediate section of the fibrous texture forming a retention area preform.

5. A gas turbine casing made of composite material, comprising a fibrous reinforcement constituted by the fibrous preform according to claim 4, and a matrix densifying the fibrous reinforcement.

6. The gas turbine casing according to claim 5, wherein said gas turbine casing is a gas turbine fan casing.

7. An aeronautical gas turbine engine having the gas turbine casing according to claim 5.

8. A method for manufacturing a fibrous texture by three-dimensional or multi-layer weaving between a plurality of layers of warp strands extending in a longitudinal direction and a plurality of layers of weft strands extending in the lateral direction, the fibrous structure having the shape of a strip extending in the longitudinal direction over a determined length between a proximal portion and a distal portion and in the lateral direction over a determined width between a first lateral edge and a second lateral edge, the method comprising the weaving of first and second longitudinal sections each extending over the determined length of the fibrous texture along the longitudinal direction and over a width from the first or second lateral edge smaller than the determined width of the fibrous texture along the lateral direction, the first and second longitudinal sections each comprising warp strands and weft strands constituted by carbon fibers, the method further comprising the weaving of an intermediate section present between the first and second longitudinal sections, wherein at least a portion of the warp strands present in the intermediate section are hybrid warp strands constituted only by both carbon fiber filaments and glass fiber filaments.

9. The method according to claim 8, wherein the intermediate section comprises hybrid warp strands having a size greater than the size of the warp strands present in the first and second longitudinal sections.

10. The method according to claim 8, wherein the hybrid warp strands comprise between 10% and 90% of glass fiber filaments based upon the total number of filaments comprising the hybrid warp strand.

* * * * *